United States Patent [19]
Bath

[11] Patent Number: 6,083,293
[45] Date of Patent: Jul. 4, 2000

[54] METHOD FOR ENHANCED PLANT PROTEIN PRODUCTION AND COMPOSITION FOR USE IN THE SAME

[76] Inventor: Virginia L. Bath, 12609 Marine Dr., Marysville, Wash. 98271

[21] Appl. No.: 09/028,696

[22] Filed: Feb. 24, 1998

Related U.S. Application Data

[60] Provisional application No. 60/038,808, Feb. 24, 1997.
[51] Int. Cl.[7] .................................. C05F 1/00; C05F 5/00
[52] U.S. Cl. .......................... 71/16; 71/24; 71/26; 71/28; 71/64.1
[58] Field of Search .................... 71/16, 28, 26, 71/24, 64.1, DIG. 2

[56] References Cited

U.S. PATENT DOCUMENTS

| | | | |
|---|---|---|---|
| 5,622,819 | 4/1997 | Herman | 435/4 |
| 5,720,793 | 2/1998 | Kato et al. | 71/16 |

*Primary Examiner*—Gary P. Straub
*Attorney, Agent, or Firm*—Todd N. Hathaway

[57] ABSTRACT

The present invention provides a method for enhanced crop production and compositions for use in the same. A two-part solution system is utilized, the two solutions being stored separately until being mixed just prior to application.

The first solution includes a chelated calcium component, a humus extract component, and a urea nitrogen component in aqueous solution. The second solution includes an algae extract component, and a yeast/molasses component comprising a mixture of yeast and blackstrap molasses. The chelated calcium complex may be a liquid chelated trihydroxy-glutarate complex, and the humus component may be a liquid Leonardite humus extract material. The algae extract component, in turn, may be a fucaceae extract material, preferably a 5-25-25 ascophyllum nodosum extract fertilizer material. Application of the treatment composition may be by foliar spray, and ground treatment and seed banding may also be utilized.

20 Claims, No Drawings

METHOD FOR ENHANCED PLANT PROTEIN PRODUCTION AND COMPOSITION FOR USE IN THE SAME

This application claims benefit of provisional application Ser. No. 60/038,808 filed Feb. 24, 1997.

BACKGROUND OF THE INVENTION a. Field of the Invention

The present invention relates generally to agricultural methods for providing enhanced crop qualities, and, more particularly, to a method and composition for treating alfalfa and other agricultural crops for enhanced production of qualitative and quantitative vegetable proteins, thereby increasing the biological value of the product.

b. Background

While fertilizers and other known agricultural treatments have been successful in improving crop yields and other plant properties, there are other crop qualities for which significant advances have not been achieved using conventional chemical, organic chemical, or organic techniques. In particular, the protein content of various crops, notably alfalfa, have not been increased above certain levels which are now considered "normal" in the industry; for example, average "high" crude protein levels in alfalfa are considered "normal" when in the range of about 17–22%.

It would be desirable if the protein content of alfalfa or certain other crops could be increased above the presently available levels, both for human consumption and for use of the product in animal feeds. This would offer the benefit of greatly enhanced nutrient value when the crop is used as a feed material. Also, increased protein content levels in alfalfa and other crops would be beneficial in numerous non-feed products and processes, notably in the pharmaceutical and chemical industries.

Accordingly, there exists a need for a method for treatment of alfalfa and other products so as to increase the plant protein content levels thereof, and a composition for use therein. Moreover, there is a need for such a method and composition which enhances the growth characteristics of the crop, and which can be applied in a convenient and economical fashion by farmers and other commercial growers.

SUMMARY OF THE INVENTION

The present invention has solved the problems cited above, and is a method for organic chemical treatment of alfalfa, legumes, fruit, and other grain, vegetable, and fruit crops, particularly for enhanced protein content, and a composition for use in the same.

Broadly, the method of the present invention includes the treatment of the crop for enhanced production using a two-part liquid organic fertilizer system, in which the two parts are mixed together prior to application. Application may be by foliar spray.

The method may comprise the steps of: (a) preparing a first aqueous treatment solution by mixing in predetermined amounts a calcium component comprising a calcium complex containing material, a humus component comprising a humus extract material, and a urea component comprising a urea nitrogen containing material; (b) preparing a second aqueous treatment solution by mixing in predetermined amounts: an algae extract component comprising a fucaceae containing material, and a yeast/molasses component comprising a mixture of yeast and blackstrap molasses in predetermined amounts; (c) mixing the first aqueous treatment solution with the second aqueous treatment solution in predetermined amounts to form an aqueous application solution; and (d) applying the aqueous application solution to the crop in a predetermined amount so as to enhance production thereof.

The calcium component may comprise a chelated calcium complex material. The chelated calcium complex material may comprise a liquid chelated trihydroxy-glutarate complex.

The humus component may comprise a Leonardite humus extract material.

The urea component may comprise a nitrogen-urea material. In the preferred embodiment, the first or second or both solutions may be included in an amount up to about 20% by weight of the first solution.

In the second aqueous treatment solution, the algae extract component may comprise an ascophyllum nodosum extract containing material. The ascophyllum nodosum extract containing material may comprise a 5-25-25 concentrated ascophyllum nodosum extract fertilizer solution.

The yeast/molasses component, in turn, may comprise a mixture of brewer's yeast and blackstrap molasses in predetermined amounts.

The step of applying the application to the crop may comprise the step of applying the application to foliage of the crop, applying the application solution to soil in which the crop is planted, and/or applying the application solution to seeds from which a crop is grown.

The present invention also provides compositions for treatment of crops using the procedures disclosed therein.

For foliar application to alfalfa and clover, the application rate may be in the range from about 1–2 quarts of the concentrate material, diluted at the rate of about 50–100 gallons of water per quart of concentrate, per acre of crop. Other application rates may be used for other types of crops, including various vegetables, legumes, fruits, grasses and hays, and the like. An annular rate of application of 1–6 gallons of concentrate per acre per year is generally suitable, and this may be applied using split applications of 4–8 cover sprays over the growing season.

The present invention is capable of raising the protein content of alfalfa to the 30–60% level, and produces increased plant protein levels in other crops. This in turn leads to enhanced crop qualities in related areas which are important for use of the crop as a raw material for purposes other than animal/human feed, such as the chemical and pharmaceutical industries.

DETAILED DESCRIPTION a. Overview

The present invention employs a two-part aqueous-based system for application of water soluble micronutrients in a non-toxic, non-hazardous form. The system is particularly suited to foliar application to alfalfa and other crops, as will be described in greater detail below. In the case of alfalfa, the treatment of the crop in accordance with the present invention has raised the protein levels from the normal 20% range to a proven 30–34% level at 1/10th bloom, and it is believed that the process is capable of raising the protein content of alfalfa to 60% or greater, depending on proper environmental conditions and when used with the proper amounts of water so as to avoid stressing the plants.

Treatment of alfalfa in accordance with the present invention also expands the leaf size of the plants (i.e., the thickness, width, and number of leaves is increased), lowers the acid detergent fiber (ADF) levels, and raises the total digestible nutrient (TDN) rate to in the range of about 69–74% (at 30–15%–30–85% protein), and greater when the alfalfa protein levels are in the range from about 30–95%. With these results, the relative feed value (RFV) of the crop is believed to range to about 192% and possibly higher. These results have been achieved when used directly with a quality alfalfa seed and proper soil conditions, as required for alfalfa at the time of crop establishment.

The two components of the two-part fertilizer/treatment composition used in the method of the present invention are (i) an aqueous calcium complex humus extract solution incorporating a urea component, and (ii) an aqueous solution of fucaceae (a family of marine brown algae) extract and yeast-blackstrap molasses slurry, also with a urea component. The two parts are combined shortly before application; storing the material for an extended period with the two parts combined can result in congealing/precipitation of materials in the solutions, rendering the product difficult to apply.

As will be described in greater detail below, a preferred embodiment of the organic treatment composition of the present invention is described herein with reference to certain specific source or starting materials, such as a preferred humus extract material, custom ascophyllum nodosum extract, and blackstrap molasses. It will be understood, however, that these particular starting materials are preferred mostly for the reason that they are the most economical and readily available materials known to the inventor which contain the desired micronutrients and other constituents in suitable proportions and form for use in the present invention, and that therefore other source materials which provide the desired micronutrients in suitable form may be identified by those skilled in the art and used in accordance with the methods disclosed herein without falling outside the scope of the present invention. Moreover, it will be understood that as used in this description and the appended claims, the terms "humus extract", "ascophyllum nodosum extract", "blackstrap molasses", and "karo-type syrup" include not only these materials having naturally-occurring base materials, but also such materials as may be produced synthetically to have substantially similar chemical compositions for purposes of the present invention.

As will be described in greater detail below, advantages provided by the present invention include enlarged leaf structure, fortified tissue composition and/or density, and increased quantity of leaves through naturally occurring hormone functional effect. Moreover, it is believed that the present invention elevates the biological value of simple and conjugated proteins, and vital nutrients, which included carbohydrates, fats—cholesterol (for steroids) and/or oils, proteins, minerals, vitamins, enzymes, coenzymes, phytochemicals, bioflavonoids, and anti-oxidants that act as chemical scavengers, intercepting reactive molecules or free radicals before damaging cells and expands the capability of essential and nonessential amino acids, or single parts from which more complex proteins are formed. Also, the process aids in the defense against disease and insect infestation in plant and/or vegetable crops, leading to increased yields and crop survival rates.

b. Composition

As was noted above, a composition in accordance with the present invention is a two-part aqueous fertilizer/treatment solution which is preferably mixed together just prior to application. The two components are (i) the calcium complex humus extract solution and (ii) the fucaceae extract-yeast slurry/molasses solution, both of which also contain a urea component. The two solutions will be described individually below:

Part 1. Calcium Complex—Humus Extract Solution

The following specific components have been found to provide this part of the solution with superior performance characteristics for use in the present invention.

The preferred calcium complex is a liquid chelated trihydroxy-glutarate complex available under the product name "organic chelating agent" from CSI Chemical Corporation, 10825 NE Hubbell Ave., Box 39, Bondurant, Iowa 50035. This material is noncorrosive (i.e., it is a low salt formulation which will not cause significant burn damage when applied to the plant leaves) and does not contain synthetic molecules or toxic chlorine compounds which will be retained as residuals in either the plants or soil.

By way of background, this product is derived from five carbon sugars/pentosans which are extracted from natural rice hulls. In the processing, these sugars are oxidized to form trihydroxyglutaric acid, an organic acid which works in the soil in a manner similar to a colloidal material, in that it is capable of exchanging and holding nutrients. The organic acid is subsequently combined with fine-ground, essentially pure calcium. During this process, the calcium is sequestered by the organic chelating acid, forming a completely organic chelated calcium complex. To the best of Applicant's knowledge, this product is possibly the only liquid calcium source which incorporates this unique chelating agent, which has the additional function of releasing insoluble calcium which is already present in the soil (i.e., prior to application).

In the present invention it is believed that the calcium complex solution serves the following functions, and possibly others:

(a) reduces toxic hydrogen in the soil that may have a negative impact on the crop;

(b) helps to reduce nitrates and neutralize organic acids in the plant, and also to activate several of the plant's enzyme systems;

(c) stimulates root and leaf development;

(d) increases yields indirectly by reducing acidity, which in turn lowers solubility and toxicity of manganese, copper, and aluminum which may be present in the soil;

(e) increases yields indirectly by improving root growth conditions and stimulating microbial activity, molybdenum availability, and uptake of nutrients;

(f) improves the availability of phosphorus to the plant (even if no additional phosphorus has been applied), due to the replacement of phosphate ions in the structure of the metal phosphate compounds in the material and subsequent phosphate release into the soil solution for plant utilization;

(g) provides an essential structural component for formation of cell walls having sufficient elasticity for normal plant development;

(h) provides essential portion of plant enzyme systems, particularly those which deal with metabolism of phosphorus;

(i) improves soil structure, particularly with regard to flocculation and water infiltration;

(j) supplies calcium requirement of rhizobia bacteria, which inhabit the roots of legumes but have a limited tolerance to soil acidity. This symbiotic relationship requires more narrow pH range for optimum growth than in the plants not requiring bacterial for alfalfa function best in a 6.8–7.0 pH range, and for soy beans in a 6.0–6.2 pH range.

Although many of the above benefits of calcium as a plant nutrient are known individually to those skilled in the art, it is important to recognize that the present invention provides this material in a micronutrient form and in cooperation with the other constituents of the formula, so as the maximize their bioavailability and yield the unexpected advantages which are produced by the present invention.

The preferred humus extract for use in the present invention, in turn, is a liquid product available in liquid form under the trademark "LIQUID HUMUS™" from Actagro, 4111 N. Golden State Blvd. Suite 101, Fresno, Calif. 93722; this material includes soil humus-like substances extracted from Leonardite (an organically complex phosphate), by a patented process. By way of background, the Leornardite source material for this product is a cold-resinated humus material containing approximately 22 organic acids and being made up by about 22% of organic-based carriers. The organic base includes humic acid, falemic acid and nutrient concepts, and is needed with phosphoric acid to produce an organically complex phosphate. The material is stable, non-flammable, and odorless, and serves to promote root development and enhance the plant uptake of nutrients.

The liquid humus extract material may suitably be combined with the calcium complex described above at a ratio of about 2:1–6:1 calcium complex to humus extract.

The final constituent of the preferred calcium complex-humus component is conventional urea nitrogen, as is available from most farm cooperative/feed supply companies, e.g., Cenex, Land O' Lakes outlets, etc. This serves to provide an excellent source which is superior to nitrates in terms of both bioavailability and its effects on the plant's structure and soil. Sufficient water is added to fully dissolve the urea prior to it being mixed with the other two liquid components.

In an exemplary embodiment of the present invention, the liquid calcium complex and humus extract are mixed at a ratio of approximately 3:1, with the balance of the solution being formed by nitrogen urea in an amount up to about 20% by weight of the total mixture, with sufficient water to dissolve all three constituents and maintain them in solution at normal ambient temperatures.

Part 2. Fucaceae Extract—Yeast/Molasses Slurry Solution

The preferred components of this part of the treatment composition are as follows: (a) custom mixed ascophyllum nodosum extract, (b) yeast slurry/blackstrap molasses mixture, and (c) urea nitrogen, all in an aqueous solution.

An analysis of a basic ascophlum nodosum extract material is set forth in the following table:

| Average Analysis of Ascohyllum Nodosum water Soluble Ingredients | | | | | |
| --- | --- | --- | --- | --- | --- |
| | | | | Processed & dried | |
| Element | Percent | Element | Percent | Component | % |
| Ag - silver | .000004 | Mg - magnesium | .213000 | Protein | 5.7 |
| Al - aluminum | .193000 | Mn - manganese | .123500 | Fat | 2.6 |
| Au - gold | .000006 | Mo - molybdenum | .001592 | Fiber | 7.0 |
| B - boron | .019400 | N - nitrogen | 1.467000 | Nitrogen-free extract | 58.6 |
| Ba - barium | .001276 | Na - sodium | 4.180000 | Ash | 15.4 |
| Be - beryllium | Trace | Ni - Nickel | .003500 | Moisture | 10.7 |
| | | | | | 100.0 |
| Bi - bismuth | Trace | O - oxygen | Undeclared | | |
| Br - bromine | Trace | Os - osmium | Trace | | |
| C - carbon | Undeclared | P - phosphorus | .211000 | Components also include: | |
| Ca - calcium | 1.904000 | Pb - lead | .000014 | Carotene, | |
| Cb - niobium | Trace | Pd - palladium | Trace | Vitamins D, K, and most | |
| Cd - cadmium | Trace | Pl - platinum | Trace | of the water soluble | |
| Ce - cerium | Trace | Ra - radium | Trace | vitamins, including | |
| Cl - chlorine | 3.680000 | Rb - rubidium | .000005 | vitamin B-12. | |
| Co - cobalt | .001227 | Rh - rhodium | Trace | | |
| Cr - chromium | Trace | S - sulfur | 1.564200 | | |
| Cs - cosium | Trace | Se - selenium | .000043 | | |
| Cu - copper | .000635 | Sb - antimony | .000142 | | |
| F - fluorine | .032650 | Si - silicon | .164200 | | |
| Fe - iron | .089560 | Sn - tin | .000006 | | |
| Ga - gallium | Trace | Sr - strontium | .074876 | | |
| Ge - germanium | .000006 | Te - tallunium | Trace | | |
| H - hydrogen | Undeclared | Th - thorium | Trace | | |
| Hg - mercury | .000190 | Ti - titanium | .000012 | | |
| I - iodine | .062400 | Tl - thallium | .000293 | | |
| Id - indium | Trace | U - uranium | .000004 | | |
| Ir - iridium | Trace | V - vanadium | .000531 | | |
| K - potassium | 1.280000 | W - tungsten | .000033 | | |
| La - lanthanium | .000019 | Zn - zinc | .003516 | | |
| Li - lithium | .000007 | Zr - zirconium | Trace | | |

The preferred fucaceae extract for use in this solution is a custom 5-25-25 concentrated ascophyllum nodosum extract (ascophyllum being a type of rockweed, other rockweeds (fucus) and gulfweeds sargassum) also being member of the fucaceae family) fertilizer solution available from Lane, Inc., P.O. Box 204, Charles City, Iowa 505616. This product is a mixture of ascophyllum nodosum, hydrolyzed fish, urea, phosphoric acid, tetrapotassium, pyrophosphate, and trace minerals in the approximate percentages set forth below:

| | | |
|---|---|---|
| Boron | 0.0614% | ($B_2O_3$ - .02%) |
| Iron | 0.143% | ($Fe_2O_3$ - .10%) |
| Manganese | 0.064% | (MnO - .05%) |
| Molybdenum | 0.0006% | ($MoO_2$ - .0005%) |
| Zinc | 0.062% | (ZnO - 0.5%) |
| Chlorine | not more than 0.5% | |

This product has a guaranteed analysis of 5-25-25, i.e., 5% total nitrogen (water soluble organic and/or urea nitrogen), 30% available phosphoric acid ($P_2O_5$), and 30% soluble potash ($K_2O$). Moreover, in the custom formulation of this product, double di-potassium phosphate may be substituted for tetrapotassium pyrophosphate in some embodiments.

This product provides a combination of inorganic elements and low salt based fertilizer that plays an important part in the overall formula, notably in the promotion of plant photosynthesis and nutrient uptake for fuller fruiting.

The yeast slurry component is preferably formed from natural brewer's yeast (buds), with a suitable product of this type being available from Lewis Laboratories International, Ltd., 49 Richmondville Avenue, Westport, Conn. 06880. This material contains amino acids, important vitamins, minerals and trace elements, carbohydrates and protein (from sugar beets), and approximately 9 fat calories per gram.

In the present invention, the functions of this material include providing an amino acid source and a fat source, in additional to providing additional micronutrients; Brewer's yeast is believed by Applicant to be the most economic and readily available source of this combination of trace materials and amino acids. In the metabolic processes of the crops, the plants produce cholesterols from the fats provided by the brewer's yeast component, in a form that can be metabolized by the plant. It is believed that this in turn acclimates the plant to using and storing fat at higher levels than is normal without the treatment of the present invention. This acclimation to higher fat usage/storage is believed to produce metabolic changes in the plant which ultimately lead to a greatly increased protein content at the time the crop is harvested.

Analysis of an exemplary yeast material suitable for use in the present invention is set forth in the following table:

| YEAST (1 oz): | | | | | |
|---|---|---|---|---|---|
| AMINO ACIDS: | | | | | |
| Alanine | | 1326 mg. | | 7.37% | |
| Arginine | | 1047 mg. | | 5.82% | |
| Aspartic Acid | | 1350 mg. | | 7.5% | |
| Cystine | | 213 mg. | | 1.18% | |
| Glutamic Acid | | 1800 mg. | | 10.00% | |
| Glysine | | 645 mg. | | 3.58% | |
| Histidine | | 357 mg. | | 1.98% | |
| Isoleucine | | 717 mg. | | 3.98% | |
| Leucine | | 876 mg. | | 4.87% | |
| Lysine | | 882 mg. | | 4.90% | |
| Methionine | | 249 mg. | | 1.83% | |
| Phenylalanine | | 675 mg. | | 3.75% | |
| Proline | | 405 mg. | | 2.25% | |
| Serine | | 624 mg. | | 3.47% | |
| Threonine | | 957 mg. | | 5.32% | |
| Tryptophane | | 303 mg. | | 1.68% | |
| Tyrosine | | 912 mg. | | 5.07% | |
| Valine | | 912 mg. | | 5.07% | |
| Mineral and Trace Elements & Other: | | | | | |
| Calcium | | Manganese | | Selenium | |
| Cobalt | | Molybdenum | | Silicon | |
| Chromium | | Nickel | | Sodium | |
| Iron | | Phosphorus | | Zinc | |
| Magnesium | | Potassium | | | |
| Inositol | 101.4 mg. | Choline | 126 mg. | RNA/DNA | 2.12 g |
| PABA | .792 mg. | | | | |
| Thiamine | | Riboflavin | | Niacin | Pyridoxine |
| Folic Acid | | Vitamin B-12 | | Copper | Biotin |
| Pantothenic | | Protein 16 gm. | | Carbohydrate | 10 g. |
| Calories per gram: | | Fat 9 (unsaturated) Protein 4 | | Carbohydrate | 4 g. |

The blackstrap molasses component, in turn, may suitably be Barbados Blackstrap Molasses, available from Allied Old English, Inc., Port Reeding, N.J. The blackstrap molasses is a residual by-product of the sugar refining industry, and is a natural calcium and iron source which also contains sulphur, potassium, magnesium, phosphate, and other micronutrients, but without a high salt content which would cause corrosive damage to the plant. Moreover, the blackstrap molasses contains no significant amount of sugar or ascorbic acid. For example, typical constituents of a suitable blackstrap molasses noted above are set forth in the following table:

| Blackstrap Molasses | 100 gms-water soluble constituents |
|---|---|
| Carbohydrates | 55 gm |
| Ash | 10.5 gm |
| Calcium | 600 mg |
| Phosphorus | .84 mg |
| Iron | 16.1 mg |
| Magnesium | 96 mg |
| Potassium | 29.27 mg |
| Thiamine | .11 mg |
| Riboflavin | 19 mg |
| Niacin | 2 mg |
| Ascorbic Acid | none |
| Sugar | none |
| Water | 24% (uncut( |
| Calories | 213 |

Inasmuch as the blackstrap molasses (which should not be confused with ordinary cooking molasses which is sold for human consumption, and which locks the solvent value and other qualities requisite for the present invention) is a residue from the sugar refining process, this is somewhat analogous to the micronutrients in the original sugar cane having been "distilled" down to a concentrated level, while retaining their optimal proportions and configurations for absorption and bioavailability for the plant to which the composition is applied. Moreover, the sulphur, iron, and other micronutrients in the blackstrap molasses greatly enhance the activity of soil and plant micro-organisms, proteins and enzymes, continuously building a nutritious soil base when applied on a regular (e.g., monthly) application cycle during the growing season; this also works to preserve the plant's root system throughout extreme cold winters and/or unusual weather conditions or changes.

In some applications, the blackstrap molasses component may be supplemented with an addition of a dark karo-type syrup, which "exuberant" level if microbial activity, thus expanding and energizing the growth and survival of beneficial/constructive microorganisms.

The yeast slurry-blackstrap molasses mixture may suitably be prepared as follows: 60 grams (approximately 4 tablespoons) natural brewer's yeast is mixed with approximately 6 ounces of warm water (approximately 120–180° F.) that has first been sterilized. This is then filtered and pressed through a fine mesh screen, using the water as a vehicle. Approximately 4 ounces of blackstrap molasses is then mixed into the natural brewer's yeast slurry, after the yeast has been screened and filtered; the temperature of both fluid streams should be raised to about 180–190° F. before adding the molasses to the yeast slurry to ensure proper mixing under safe conditions (owing to potential volatility/combustibility of the molasses).

The yeast slurry-blackstrap molasses mixture is then combined with the 5-25-25 ascophyllum nodosum extract described above; a suitable ratio for the mixture is approximately 4:1 ascophyllum nodosum to yeast slurry-blackstrap molasses.

The final constituent of this solution is again preferably urea nitrogen, up to a maximum of about 20% by weight of the full mixture, this being mixed with sterile water in an amount sufficient to achieve the desired dilution factor prior to adding to the main formula.

c. Mixing

Exemplary mixtures for the two-part solution system prepared as described in the preceding section may be as follows:

| PART 1 (per gallon) | PART 2 (per gallon) |
|---|---|
| 3 qts. calcium complex | 2 qts. 5-25-25 ascophyllum nodosum |
| ½ quart liquid humus | 1/2 qt. yeast slurry-blackstrap molasses mixture |
| 20% (max.) nitrogen urea in water | 20% (max.) by weight nitrogen urea in water |

As was noted above, the two parts of the organic treatment system (i.e., the calcium complex-humus extract solution and the ascophyllum nodosum extract-yeast slurry/molasses solution) are stored separately until just prior to use, in order to avoid gelation/precipitation problems. Also, the material may be crystallized/spray (freeze) dried if desired.

To prepare the product for application to the crop, ½ quart of each of the Parts 1 and 2 are drawn and mixed together to form 1 quart of concentrate solution. Then, prior to application, this 1 quart of concentrated product is diluted to the desired level, depending on the type of plant, environmental conditions, and soil quality involved; for example, the dilution range for most applications is preferably from about 50 gallons of water/quart of concentrate to about 100 gallons of water/quart of concentrate.

The treatment composition described herein also mixes readily with most chemicals used in the horticulture industry, although a compatibility test is advised and recommended for each combination before tank mixing. In order to conduct the test, the operator should start with the desired percentages of water in the test container, and then add the organic treatment solution of the present invention and the other chemicals to the test solution. The materials should not be applied with phosphate fertilizers, copper, or sulfates. The two parts of the solution should be mixed together only immediately before application, when the operator is prepared to add the necessary amount of dilution water (approximately 50–100 gallons per quart of combined concentrate). This amount of water not only provides the desired dilution factor for the concentrate, but also provides sufficient total liquid volume (50–100 gallons) for good spray coverage over a one-acre area.

In handling the materials of the present invention, ordinary precautions similar to those suggested for most other non-toxic chemicals are recommended, such as the wearing of gloves and goggles and washing skin after contact.

Other example mixes, which are particularly suited to the applications which are indicated, include the following:

OTHER EXAMPLE MIXES

Example A—Soil treatment and seed banding (can be applied as concentrate or diluted with water—will not harm seeds).

For 1 1/2 gallon concentrate:

2 qts/1.89 liters Ascophyllum nodosum liquid made from:
    11.36 pz/322 g. Ascophyllum nodosum powder.

4 Tbsp/56.7 g Yeast in yeast slurry—mixed & heated w/:

8 Oz/236.6 g Raw uncut & heated blackstrap molasses.

2 qts/1.89 liters Trihydroxy-glutarate

8% Urea solution (in enough water to dissolve Urea)

1 pt/473.12 ml. Water for mixing, screening & filtering when necessary—Expanded, Naturally occurring Enzymes (amount & type dependent on soil sample)

Apply approximately 1½ gallon per 1 acre initially to establish soil and promote quality/vigorous germination:

Example B—Foliar application (apply directly after cutting hay or grass crops . . . after hay/grass is taken off field).

2 qts/1.89 liters Ascophyllum nodosum liquid 5-10-10
   4 Tbsp/56.7 g. Yeast in yeast slurry-mixed w/:
      8 oz/236.58 ml. Raw uncut & heated blackstrap molasses w/:
      2 Tbsp/28 g. Wettable Sulfer Dust 8 oz/236.58 ml. Dark Karo-type syrup.

1 pt/473.12 ml. Liquid Humus diluted w/:
   1 pt/473.12 ml Water

20% Urea solution (in enough water to dissolve Urea)

1 pt/473.12 ml. Water for mixing, screening & filtering—Expanded Enzymes (from those which occur in this Formula)

The above 1 (+) gallon provides 4-1 quart applications, which equal 1 application per acre per month.

Example C—Foliar application 11.36 oz/322. g. Ascophyllum nodosum powder

4 Tbsp/56.7 g. Yeast in yeast slurry mixed & heated w/:
   8 oz/236.58 ml. Raw uncut & heated blackstrap molasses mixed w:/
   2 Tbsp/28 g. Wettable Sulfur Dust 2 qts/1.89 liters Trihydroxy-glutarate 20% Urea solution (dissolved in approximately 1 qt. Water)

1 qt/946.32 ml. water for dissolving, mixing, screening & filtering

The above 1 gallon provides four 1 quart applications, which equals one application per acre per month.

Example D—House plants

1½ qts/1.473 liters Ascophyllum nodosum 5-10-10

4 Tbsp/56.7 g. Ascophyllum nodosum powder

1½ pt/709.68 ml. Water

10% Urea solution

All ingredients filtered together.

No more than 1 Tsbp. concentrate per gallon of water.

d. Application

The organic treatment composition of the present invention may be applied to the ground or seed in some embodiments, but is most eminently suited to foliar application (after mixing the two parts of the system), i.e., by spraying onto the plant leaves.

Applied foliarly, the preferred amount for alfalfa and clover is approximately 1–2 quarts of the concentrate (suitably diluted, as described above) per acre of crop. For hay, the solution should be applied at approximately 6–8 inches of new growth and after each cutting. For seed however, the solution should be applied at the bud stage, and then repeated thereafter at intervals of approximately 7–10 days.

Although the results described herein have largely been achieved while working with alfalfa as the test crop, it is believed that the organic treatment solution may provide similar benefits when used with a variety of other crops. A list of suitable amounts (approximate) of concentrate for foliar application to other types of crops is set forth in the table below; it should be understood, however, that this list is exemplary in nature, and not exclusionary, in that the methods and compositions disclosed herein may be used with crops other than those listed in the table without departing from the scope of the present invention.

RECOMMENDED AMOUNTS FOR FOLIAR APPLICATIONS

ALMONDS—1 to 2 qts. per acre per application. Apply pre- and/or post-bloom and repeat at intervals of 7–10 days.

APPLES, PEARS—1–2 qts. per acre per application. Apply pre-and/or post bloom and repeat at intervals of 7–10 days. For pears, use 1 to 2 qts per acre per application.

APRICOTS, PRUNES, PLUMS, NECTARINES, PEACHES, CHERRIES—1–2 qts. per acre per application. Apply pre and/or post-bloom and repeat at intervals of 7–10 days.

ARTICHOKES—1 to 2 qts. per acre per application. Apply when flowers are in bud stage, repeat every 7–10 days.

ASPARAGUS—1 to 2 qts. per acre per application. Apply just after start of new fern growth, repeat every 7–10 days.

AVOCADOS—1 to 2 qts. per application. Flush wet foliage.

BEANS, SOYBEANS, PEAS, LENTILS—1 to 2 qts. per acre per application. First application at bud to early bloom, repeat every 7–10 days.

CRANBERRIES, BLUEBERRIES—1 to 2 qts. pre acre pre-bloom, repeat at intervals of 7–10 days.

CARROTS, BEETS, SWEET POTATOES AND OTHER VEGETABLE ROOT CROPS—1 to 3 qts. per acre when plants are 3 to 4 weeks old, repeat at intervals of 7–10 days.

CITRUS (ALL VARIETIES)—1 to 2 qts. per acre per application. First application pre-to post-bloom with later applications over new growth flushes.

CORN (SWEET AND FIELD)—1 to 4 qts. per acre per application.

COTTON—1 to 2 qts. per acre per application at regular intervals during growing season.

CRANBERRIES—1 to 2 qts. per acre per application. First application at hook stage, second application just after fruit set.

FIGS—1 to 3 qts. per acre per application.

FLOWERS & ORNAMENTALS—0.26 ml per square foot. Mix with a minimum of 3.5 mil water per square foot. Split rate ½ or ⅓ and make 2 or 3 applications.

GRAPES—½ to 2 qts. per acre per application. First application when new shoots are in the 4 to 6 leaf stage, repeat as needed.

HOPS—1 to 2 qts. per acre per application in cover sprays.

LETTUCE, CELERY, COLE CROPS AND LEAF VEGETABLE—1 to 2 qts. per acre per application. Make 1 to 3 applications at intervals of 7–10 days throughout the growing season starting when plants are 3–4 weeks old. For Blackheart celery, apply 1 to 2 qts. per acre at first sign of deficiency symptoms and repeat every 10–15 days as needed.

MELONS, CUCUMBERS AND OTHER CUCURBITS—1 to 2 qts. per acre per application. Make two or more applications at intervals of 7–10 days starting just prior to bloom.

MINT—1 to 2 qts. per acre per application.

NUT CROPS (WALNUT, PECANS, PISTACHIOS, FILBERTS)—1 to 2 qts. per acre per application, pre-bloom and in cover spray.

OLIVES—1 to 2 qts. per acre per application. Apply 15 to 20 days after thinning, repeat 3–4 weeks later. If crop is not thinned, apply 1–2 weeks after full bloom, repeat 3–4 weeks later.

ONIONS (DRY AND GREEN), GARLIC—1 to 2 qts. per acre per application.

ORNAMENTAL CONIFERS—1 to 4 qts. per acre per application at regular intervals during growing season on conifers and non-flowering ornamental. On flowering plants, apply 1 to 2 qts. per acre prior to flowering. Do not apply over blossoms.

PEANUTS—1 to 2 qts. per acre per application. First application at early-bloom stage, repeat at intervals of 7 to 10 days.

POTATOES—1 to 2 qts. per acre per application. First application when plants are 4–12 inches high. Second application 3 weeks later, repeat as needed.

SAFFLOWER, SUNFLOWER, AND OTHER OILSEED CROPS—1 to 3 qts. per acre per application.

STRAWBERRIES—1 to 3 qts. per acre per application.

SUGAR BEETS—1 to 3 qts. per acre per application. First application when plants are 6 to 8 inches across. Second application 3 to 4 weeks later, repeat as needed.

TOBACCO—1 to 2 qts. per acre per application. First application 1 to 3 weeks after transplant, repeat at intervals of 7 to 10 days.

TOMATOES, PEPPERS—1 to 2 qts. pr acre per application. Make 1 to 3 applications at intervals of 3 to 4 weeks starting prior to bloom. For blossom-end rot on tomatoes, apply 2 qts. per acre every 7 to 10 days as needed.

VEGETABLE AND FLOWER SEED CROPS—1 to 3 qts. per acre per application. First application at bud to early-bloom stage, repeat applications at intervals of 7 to 10 days.

WHEAT, BARLEY, RICE, AND OTHER SMALL GRAINS—1 to 2 qts. per acre per application. First application at tillering to boot stage, repeat 7 to 10 days.

In the case of apples, it is recommended that the first application begin when the fruit is approximately 1 inch in diameter; for peaches, the first application should begin at the shuck split stage. With regard to these particular crops, when used as a foliar spray, the present invention is believed to reduce the incidence of bitter pit, cork spot, watercore, and internal breakdown in apples, giving growers longer shelf life and therefore a longer marketing season.

As a general rule, it is recommended that total application of the concentrate be in the range of about 1–6 gallons per acre per year, using split applications of 4–8 cover sprays. For example, 8 applications at 1 quart/acre/application gives a rate of 2 gallons/acre/year.

As was noted above, the composition of the present invention is eminently suited to use by foliar application, but that other applications may include ground preparation and banding with seeds. In the case of ground application, in most cases the ground must be let sit for a few months after application prior to the crop being planted.

e. Bioreactor Processing

For certain applications, notably for treatment of soils for enhanced nitrogen levels, the treatment system may be used in conjunction with a bioreactor process to produce elevated levels of microbial activity/production.

As is known, bioreactors are systems which employ various forms of vessels to support accelerated biological (cellular) activity in an optimized environment to produce a certain desired output, such as a commercially useful chemical compound or a cellular mass, for example. A relatively new form of bioreactor is the Centrifugal Bioreactor (CBR), an example of which is disclosed in U.S. Pat. No. 5,622,819 (Herman), assigned to Kinetic Biosystems, Inc., Tucker, Ga.

With regard to the present invention, the ascophyllum nodosum extract—yeast/molasses slurry solution can be added to a bioreactor (e.g., a CBR) containing a culture of nitrogen-producing/fixing bacteria or other beneficial microbes. The solution, working in the enhanced biological environment provided by the bioreactor, promotes extremely rapid growth of the organisms. In the case of nitrogen-fixing microbes, the organisms which result from the process can themselves be added to the solution of the present invention, which can then be applied to the soil for enhanced nitrogen production, thereby reducing or eliminating the need to subsequently add nitrogen-containing fertilizers. In other embodiments, the organisms or chemicals produced using the solution of the present invention can be incorporated in other products or utilized in other processes, as desired.

f. Additional Benefits

The advantages of the present invention have been described above largely in the content of increased vegetable protein production, including raising the protein levels of alfalfa to the 30–60% range. This alone greatly increases the nutrient and biological value of protein in the alfalfa and/or other crop (e.g., vegetables, fruits, legumes, forages and the like) for human and livestock consumption. In addition, the enhanced plant structure and metabolic processes made possible by the present invention increases the ability of the plant to detect, recognize, absorb, and assimilate complex nutrients through their roots, leaves, stems, buds, and flowers. The result is a biologically superior plant with many improved characteristics for use in the pharmaceutical drugs, health/nutritional, and cosmetic industries, as well as for animal/human feed.

Moreover, although the exact mechanisms involved are not fully understood at present, the enhanced metabolic activities and nutrient and structural qualities of the alfalfa and possibly other plants appears to accumulate or "build up" over several generations of the crop which is treated in accordance with the present invention, not only compounding the improvements, but appearing to lead to retention of the enhanced characteristics for one or more generations of the crop after treatment has stopped; this may be due to long-term acclamation of the plants to the increased availability/usage of certain of the micronutrients provided by the treatment solution, and possibly also due to increased levels of certain of these constituents being passed on to the seeds which are produced by the plants which have been treated.

Although the enhanced plant processes produced by the present invention yield improved qualities across a very broad spectrum of plant qualities/characteristics, some exemplary areas of improvement which Applicant believes may possibly result from treatment of various crops in accordance with the present invention are listed below:

- increased levels of complete plant proteins, flavoproteins, anti-biotics, and PHB form polymers for pharmaceutical use
- increased levels of keratin (the protein which makes up hair), for use in shampoos, for example
- increased steroid production
- enhanced raw material for production of synthetic materials
- increased sugar output (e.g., from corn, cane, beets increased enzyme and co-enzyme output improved source materials for use in manufacture of vaccines increased antioxidant production. These materials are useful as anti-inflammatories (reduce swelling and improve joint flexibility) and development of improved animal/human natural immunity against viruses and other diseases; also, they serve to reduce/eliminate non-germ diseases linked to the chemical action of free radicals increased plant resistance to airborne pathogens increased plant immunity to other diseases increased immunity in pollinating insects increased output of plant hormones, chromosomes, encodes, carbohydrates, chlorophyll, complex proteins, polypeptides, polynucleotides, DNA, cloned DNA and the like increased cholesterol output (bile acids and hormones for important steroids from improved plants and animals consuming the same)

enhanced crop content in feed produces increased animal/human immunity to a wide range of infectious diseases including hepatitis C and other strains of hepatitis and AIDS; also increases nerve regeneration for some conditions.

Accordingly, it is to be recognized that various alterations, modifications, and/or additions may be introduced into the constructions and arrangements of parts described above without departing from the spirit or ambit of the present invention as defined by the appended claims.

What is claimed is:

1. A method for treatment of a crop for enhanced production, comprising the steps of:
    forming a first aqueous treatment solution which comprises in mixture:
    a compound;
    humus extract and;
    nitrogen urea; and
    forming a second aqueous treatment solution which comprises in mixture:
    fucaceae algae extract and;
    a yeast/molasses component comprising a mixture of yeast and blackstrap molasses;
    mixing said first aqueous treatment solution with said second aqueous treatment solution to form a an aqueous application solution; and
    applying said aqueous application solution to said crop so as to enhance production thereof.

2. The method of claim 1, wherein said calcium-complex compound comprises:
    a chelated calcium compound.

3. The method of claim 2, wherein said chelated calcium compound comprises;
    a liquid trihydroxy-glutarate calcium complex.

4. The method of claim 1, wherein said humus extract comprises:
    leonardite humus extract.

5. The method of claim 1, wherein said algae extract comprises:
    ascophyllum nodosum algae extract.

6. The method of claim 5, wherein said ascophyllum nodosum algae extract comprises:
    ascophyllum nodosum algae extract in a 5-25-25 fertilizer mixture.

7. The method of claim 1, wherein said yeast/molasses component comprises:
    a mixture of brewer's yeast and blackstrap molasses.

8. The method of claim 1, wherein the step of applying said application solution to said crop comprises the step of:
    applying said application solution to foliage of said crop.

9. The method of claim 1, wherein the step of applying said application solution to said crop comprises the step of:
    applying said application solution to soil in which said crop is planted.

10. The method of claim 1, wherein the step of applying said application solution to said crop comprises the step of:
    applying said application solution to seeds from which said crop is grown.

11. The method of claim 1, wherein said crop is a legume.

12. The method of claim 11, wherein said legume is alfalfa.

13. The method of claim 1, wherein the step of mixing said first and second aqueous treatment solutions comprises:
    mixing said first and second aqueous treatment solutions to form said aqueous application solution immediately prior to applying said application solution to said crop.

14. The method of claim 1, further comprising the step of:
    mixing said aqueous application solution with water to dilute said application solution prior to application to said crop.

15. A method for treatment of a crop for enhanced production, comprising the steps of:
    preparing a first aqueous treatment solution by mixing:
    a liquid trihydroxy-glutarate calcium complex;
    liquid leonardite humus extract; and
    nitrogen urea in an amount up to about 20% by weight of said first solution;
    preparing a second aqueous treatment solution by mixing:
    ascophyllum nodosum algae extract in a 5-25-25 fertilizer mixture; and
    a yeast/molasses slurry comprising a mixture of brewer's yeast and blackstrap molasses;
    mixing said first aqueous treatment solution with said second aqueous solution to form an aqueous application solution; and
    applying said aqueous application solution to said crop so as to enhance production thereof.

16. A composition for treatment of a crop for enhanced production, comprising:
    a first aqueous treatment solution, comprising:
    a calcium-complex compound;
    humus extract; and
    nitrogen urea; and
    a second aqueous treatment solution, comprising:
    fucaceae algae extract; and
    a yeast/molasses component comprising a mixture of yeast and blackstrap molasses;
    said first and second aqueous treatment solutions being mixed to form an aqueous application solution to be applied to said crop so as to enhance production thereof.

17. The composition of claim 16, wherein said calcium-complex compound comprises:
    a chelated calcium compound.

18. The composition of claim 16, wherein said humus extract comprises:
    leonardite humus extract.

19. The composition of claim 16, wherein said fucaceae algae extract comprises:

ascophyllum nodosum algae extract in a 5-25-25 fertilizer mixture.

20. A composition for treatment of a crop for enhanced production comprising:
 a first aqueous treatment solution, comprising:
  a liquid trihydroxy-glutarate calcium complex;
  liquid leonardite humus extract; and
  nitrogen urea in an amount up to about 20% by weight of said first solution; and
 a second aqueous treatment solution, comprising:
  ascophyllum nodosum algae extract in a 5-25-25 fertilizer mixture; and
  a yeast/molasses slurry comprising a mixture of brewer's yeast and blackstrap molasses;
 said first and second aqueous treatment solutions being mixed to form an aqueous application solution to be applied to said crop so as to enhance production thereof.

* * * * *